Figure 1:
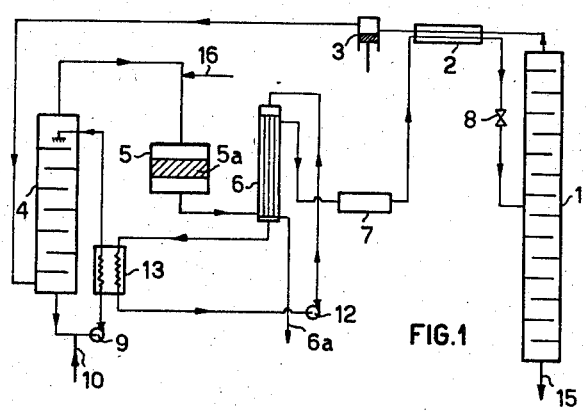

Oct. 13, 1959      J. HOOGSCHAGEN      2,908,554
PROCESS FOR RECOVERING HEAVY HYDROGEN AND HEAVY WATER
Filed Oct. 17, 1955      2 Sheets-Sheet 1

Inventor
Jan Hoogschagen
By Cushman, Darby & Cushman
Attorneys

Oct. 13, 1959 J. HOOGSCHAGEN 2,908,554
PROCESS FOR RECOVERING HEAVY HYDROGEN AND HEAVY WATER
Filed Oct. 17, 1955 2 Sheets-Sheet 2

Inventor
Jan Hoogschagen
By Cushman, Darby & Cushman
Attorneys

United States Patent Office 2,908,554
Patented Oct. 13, 1959

2,908,554
PROCESS FOR RECOVERING HEAVY HYDROGEN AND HEAVY WATER

Jan Hoogschagen, Geleen, Netherlands, assignor to Stamicarbon N.V., Heerlen, Netherlands Application October 17, 1955, Serial No. 540,949

Claims priority, application Netherlands October 22, 1954

6 Claims. (Cl. 23—210)

The present invention relates to the recovery of heavy hydrogen and heavy water.

There is a growing need for heavy water and various methods have been developed to recover heavy water from natural water or to recover deuterium from the hydrogen prepared, e.g. by the water gas reaction or from coke oven gas, and subsequently oxidize the deuterium to heavy water.

As is known, natural water and the hydrogen recovered from water gas or coke oven gas contain only about 0.015% of heavy water or deuterium, respectively, and all recovery processes are based on methods of raising the concentration of heavy water by removal of the deuterium-free water or hydrogen.

Owing to the difference in boiling point between heavy water and water it is, e.g., possible to distill natural water, in which process water poor in deuterium is removed as top-product while a concentrate rich in heavy water is removed as bottom product. However, the cost of such a distilling process is high.

Another method, involving concentration by water electrolysis, is likewise too expensive as a general rule. Therefore, it has been attempted to raise the heavy water content in still another manner by making use of the equilibrium reaction $H_2O + HD \rightleftarrows HDO + H_2$, which occurs if a mixture of water and hydrogen is led over a suitable catalyst. Depending on the D content, either deuterium contained in the hydrogen is transferred to the water or the reverse takes place so that the water is made either richer or poorer in heavy water. The equilibrium constant is dependent on temperature and the value of said constant is such that the reaction preferably proceeds towards the right hand side of the reaction equation. However, at temperatures over 100° C., it is possible to convert HDO with a reasonable yield into HD.

As a result, it has been proposed (French Patent 1,086,502) to raise the concentration of heavy water in water by effecting in a cyclic process and at two temperature levels, e.g. 100° C. and 600° C., catalytic exchange between hydrogen and water vapor in such a way that a circulating hydrogen-steam mixture in every cycle first removes deuterium from a water current introduced into the process flow after which the thus removed deuterium is given off to another water current. The latter thus becomes richer in deuterium than the former, which during the process loses part of its deuterium content.

By repeating this cycle in successive steps, wherein the water enriched in deuterium is always supplied as the deuterium containing feed to the next step, it is possible eventually to obtain a liquid which has been strongly enriched in heavy water. This process, as in the case of the distillation of natural water, has the advantage of not being limited by any restriction in the amounts of available starting material. However, the cost of the heavy water produced in this manner is still high, because of the many steps required.

It has also been suggested to start from hydrogen, e.g., the hydrogen of a synthesis gas mixture, and to rectify the same. In this way, hydrogen which is practically free of deuterium is obtained as the top product, same being suitable for use in $NH_3$ synthesis, while the bottom product comprises a hydrogen fraction which is very rich in deuterium. By further rectification and catalytic conversion of the latter fraction whereby the HD originally obtained passes into $H_2 + D_2$ and subsequent separation of $H_2$ and $D_2$ by rectification and oxidation of $D_2$, a product consisting of nearly 100% heavy water can be obtained.

The last-mentioned method is much cheaper than the various others referred to above. However, a serious disadvantage thereof is that it is impossible, for economical reasons, to produce unlimited quantities of heavy water since the process must be coupled to an existing limited hydrogen production. Moreover, the removal of nitrogen from the hydrogen is difficult and, as a result, other serious problems are apt to arise, e.g. blockage of heat exchangers and expansion apparatus due to deposition of solid nitrogen or other solids.

The object of the present invention is to develop a process which possesses the advantages of known processes while avoiding the drawbacks thereof. A more specific object is to provide a process whereby heavy water can be produced relatively cheaply and in a technically feasible manner using a starting material which is available in unlimited amounts, namely, natural water.

It has been found that the foregoing objects can be achieved by a process involving the steps of (1) providing a circulating supply of hydrogen; (2) catalytically transferring deuterium to said hydrogen from a current of water continuously fed thereto; (3) separating off the water which has become poorer in deuterium and if necessary drying the deuterium-enriched hydrogen; (4) subjecting the same to low temperature rectification whereby substantially deuterium-free hydrogen is obtained as the top product and a deuterium-enriched bottom product is obtained; (5) passing the deuterium-free hydrogen in heat exchange relationship with the dried deuterium-enriched hydrogen prior to said rectification, to lower the temperature of said deuterium-enriched hydrogen; (6) thereafter recycling said deuterium-free hydrogen as the circulating supply of hydrogen; and (7) recovering deuterium from said bottom product. The last-mentioned step comprises conversion of the bottom product into heavy water in known manner e.g. by further rectification, conversion, rectification and oxidation.

The process of the invention illustrated by the accompanying drawings wherein Figures 1–4 represent diagrammatically various alternative modes of operation. More particularly, in the process of Figure 1, hydrogen is continuously passed in a cycle through a rectifier column 1, a heat exchanger 2, a compressor 3, a saturator column 4, a reactor 5 filled with a suitable catalyst 5a, a condenser 6, and a drying plant 7 filled with, e.g. silica gel or activated $Al_2O_3$, after which it is returned through the heat exchanger 2 and an expansion apparatus 8 to the rectifier column 4.

In the saturator column 4, the hydrogen is washed with hot water, so that it is saturated with water vapor. The water running through this saturator column is kept circulating by suitable pump means 9, fresh water being supplied thereto through conduit 10.

The mixture of hydrogen and water vapor removed from the top of the saturator column 4 is passed on to the reactor 5, where the catalytic transfer of deuterium from water into hydrogen takes place according to the equation:

$$HDO + H_2 \rightleftarrows H_2O + HD$$

The water vapor is separated from the deuterium-enriched hydrogen in the condenser 6. Figure 1 shows a tubular condenser, in which cooling water flows through the tubes and the condensate precipitates on the outside of the tubes, after which it can be drained through a conduit 6a. The cooling water for the condenser 6 is kept in circulation by a pump 12, and in heat exchanger 13 gives off the heat taken up from the condensing water vapor to the water circulating through the saturator column 4. Any further amount of heat which may be found necessary can be supplied by means of steam through the fed conduit 16.

The deuterium-containing hydrogen coming from condenser 6 subsequently flows through the drying plant 7 and heat exchanger 2, wherein heat exchange is effected with the cooler (about —250° C.) deuterium-free hydrogen coming from column 1. The deuterium-containing hydrogen is then expanded in expansion apparatus 8 and subjected to rectification, the deuterium-containing concentrate being removed from the column through discharge conduit 15.

Of necessity, rectification of the hydrogen in column 1 takes place at very low temperatures (e.g. about —250° C.). This low temperature is obtained in known manner by compression followed by expansion, either via an expansion valve, or in an expansion machine, where the external energy is recovered.

It is advantageous to have the conversion with the water vapor take place with hydrogen that has already been compressed. Consequently, the conversion is effected in the high pressure part of the cycle traversed by the hydrogen. This means that the dimensions of the conversion apparatus, the saturator column and the condensers can be reduced considerably. Additionally, because of the higher pressure a higher temperature may also be maintained in saturator 4. This higher temperature promotes the desired conversion reaction in the reactor 5.

The catalytic conversion of a mixture of hydrogen and water, wherein deuterium is transferred from the water into the hydrogen, after which the water is removed, may also be carried out in several steps in series with the result that the hydrogen supplied to the rectification column is richer in deuterium than in the case where the conversion is carried out in one step.

Figure 2:
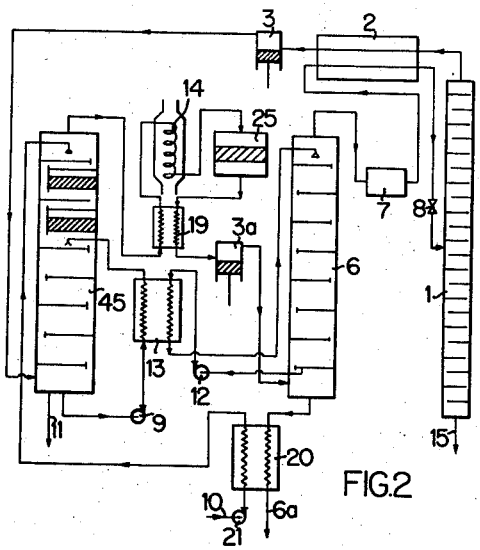

A process cycle according to the invention involving conversion in several steps as above stated is shown in Figure 2. The latter is generally similar to the arrangement shown in Figure 1 although, in Figure 2, the saturator column 4 and the reactor 5 of Figure 1 are replaced by a column 45 in which the rising current of hydrogen is alternately contacted with water, where it takes up and exchanges water vapor, and then passed through a layer of catalyst, where the conversion takes place. Conversion is preferably effected in the vapor phase and in order to prevent wetting of the layers of catalyst, which would render them less active, a heating spiral (not shown) is provided under each layer. In this way, the hydrogen mixture, which is saturated with water vapor and contains drops of water, is transferred into a state in which it is unsaturated. The water which has become poor in deuterium is removed from the process through discharge conduits 11 and 6a.

It will be noted that another difference between the embodiments of Figures 1 and 2 is that, in contrast to Figure 1, the condenser 6 of Figure 2 is a direct condenser, i.e. the cooling water directly contacts the hydrogen-water vapor mixture. It will be recognized, however, that the tubular condenser of Figure 1 can also be satisfactorily utilized in this embodiment.

It has also been found that the amount of make-up steam supplied to the system via conduit 16 can be reduced and, in some instances, entirely eliminated if compression of the gaseous hydrogen discharged from the top of the hydrogen rectification column 1 and again introduced into the cycle, to the high pressure required for reaching a sufficient degree of cooling by means of expansion at 8, is carried out in two steps. These two steps comprise (1) compressing the hydrogen to such an extent that the pressure in that part of the cycle where the water vapor is taken up amounts to 40–85% of the final pressure desired for the cold expansion, and (2) effecting the additional compression to the necessary final pressure (e.g. 12.5 to 20 atmospheres) before the point where the mixture of hydrogen and water vapor is admitted into the condenser column 6. The second compression step causes the partial pressure of the water vapor in the hydrogen-water vapor mixture to be raised, so that the condensation takes place at a higher temperature. The transfer of the heat-content of the hot water formed in the condensation to the water to be evaporated in the saturator column is thereby promoted. Hence, a substantially smaller amount of make-up steam supplied to the saturator column is sufficient.

Of the pressure limits mentioned for the first compression step, viz. 40–85% of the pressure required in the condenser column, the lower limit is in fact determined by the pressure required in the saturation and the catalytic conversion. In particular, if the pressure ratio between the first compression step and the final pressure is made still lower, the required compression energy becomes too great because of the large volume of the hot mixture of steam and hydrogen together with the large pressure rise. On the other hand, if the pressure ratio between the first compression step and the final pressure is made higher than 85%, it is only possible to transfer, part of the heat of condensation to the saturator column so that the remainder of the heat of evaporation has to be supplied in the form of expensive fresh steam.

The process whereby the compression is carried out in two steps is shown in Figure 2. The latter also shows a further feature, namely, enrichment of the hydrogen to be sent to the rectification column with deuterium by conversion of the hydrogen-water mixture in several steps at increasing temperature levels.

Referring more specifically to Figure 2, the process shown therein involves passing an amount of hydrogen in a cycle successively through rectifier column 1, heat exchanger 2, compressor 3, column 45, heat exchanger 19, gas heater 14, a catalyst-filled reactor 25, again through heat exchanger 19, a second compressor 3a, condenser column 6, drying plant 7 filled with, e.g. silica gel, heat exchanger 2, expansion apparatus 8 and then back to rectifier column 1.

In compressor 3, the hydrogen is given a pressure of for example, about 12 atm., after which it is washed in column 45 with hot water, so that a mixture of hydrogen and water vapor (volume ratio e.g. 1:1½) is obtained. In the top part of column 45, this mixture flows through layers of catalyst (such as platinum deposed on alumina) where conversion according to the equation $HDO+H_2 \rightleftarrows HD+H_2O$ takes place, and through sieve plates or bubble-cap plates, where the mixture of hydrogen and water vapor is again contacted with heavy hydrogen-containing water.

Part of the wash water can be drained from column 45 through conduit 11. In the heater 14, the mixture of hydrogen and water vapor is heated to, for example, 500–600° C., after which it passes through another layer of catalyst in reactor 25, where HDO is again converted with hydrogen into HD and water.

In compressor 3a, a further increase in pressure to, for example, 20 atm., is effected, after which the mixture of hydrogen and water vapor flows through the condenser column 6, where a large portion of the water vapor is condensed. A further drying of the heavy hydrogen-containing hydrogen takes place in the drying plant 7 which is filled with silica gel or similar drying agent. The resulting dry heavy hydrogen-containing hydrogen is strongly cooled in exchanger 2 by means of practically heavy hydrogen-free hydrogen of very low temperature (e.g. about −250° C.), discharged from the top of rectifier column 1. Further cooling is effected by means of expansion to low pressure (e.g. 2 to 1 atmospheres) in the expansion apparatus 8, which may be a valve or expansion cylinder, after which the hydrogen is introduced at a temperature of e.g. −250 to −253° C. into the rectifier column 1. The bottom product discharged through conduit 15 from this column, and rich in heavy hydrogen, is subsequently subjected to further concentration in known manner, and eventually combusted in whole or in part to form heavy water.

In the heat exchanger 20, the condensate discharged from condenser column 6 through conduit 6a, which has become poorer in heavy hydrogen, heats the fresh water supplied to the saturator column 45 through conduit 10 by means of pump 21. Two currents of water are thermally coupled in counter-current in heat exchanger 13, so that the heat released in column 6 is transferred to the saturator column 45.

Figure 3:
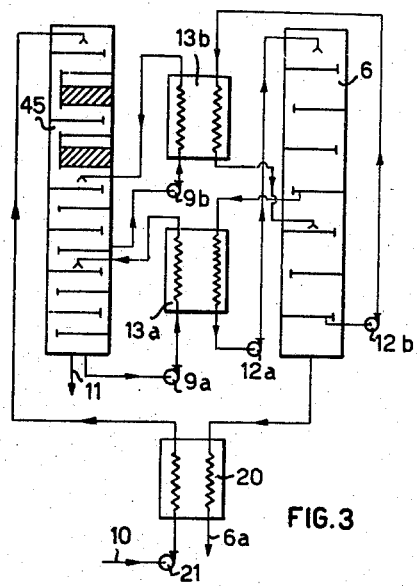

In the condenser column 6, the dew point of the mixture of hydrogen and water vapor decreases in the direction of the gas flow, whereas in the saturator column 45 the dew point of the mixture of hydrogen and water vapor rises in this direction. The result of this is that, in the lower part of the condenser column, the condensation of the water vapor releases more heat per degree of temperature fall than in the upper part and that in the upper part of the saturator column more heat is consumed for the evaporation of the water per degree of temperature rise than in the lower part of the column. For this reason, heat transfer can be made even more complete by thermally coupling more than one circulating current of water from each column. To this end, several currents are taken off one column at various levels thereof and passed in heat exchange relationship with similar currents branched off the other column. Such thermal coupling of several currents is shown in Figure 3 wherein only the saturator column 45 and the condenser 6 together with the water conduits are indicated, the various other parts of the systems shown in Figures 1 and 2 being omitted for clarity. As shown in Figure 3, the branch current extracted by pump 12a from the middle part of column 6 is thermally coupled in heat exchanger 13a to the branch current extracted from the bottom part of column 45 by pump 9a. The water cooled in this way is returned into the top end of column 6, while the heated water is introduced into the middle part of column 45. Likewise, the branch current of higher temperature extracted by pump 12b from the lower part of column 6 is thermally coupled in heat exchanger 13b with a branch current to be heated, extracted by pump 9b from the middle part of column 45, which current is again introduced into the column 45 at a point lying more towards the top of that column. The branch current extracted from the lower part of column 6 is returned to this column at a point in the middle part thereof.

The amounts of water circulating per unit of time in each pair of thermally coupled branch currents are kept equal. The circulating amount of water differs with different pairs but, in order to render the heat transfer as adequate as possible, the amount of higher-temperature water extracted by pump 12b from the lower part of condenser column 6 should be made considerably larger (e.g. 2–4 times) than the amount of lower-temperature water extracted by pump 12a from the upper part of column 6. The same ratio should exist between the amounts of water extracted from the saturator column by the pumps 9b and 9a.

As a result of the two features mentioned above, namely, compressing the hydrogen in two steps in such a way that the pressure in the condenser column 6 is about 1½ times as high as the pressure in the saturator column, and thermally coupling circulating branch currents from the two columns, the heat transfer is so adequate that the supply of fresh steam to the saturator column, which would be essential and costly except for these features, is substantially minimized and, in some cases, can be entirely eliminated. On the other hand, the compression cost of the compressor 3a is relatively low. The economization in steam which can be obtained is illustrated by the following data.

If the pressure in the condenser column 6, e.g. 20 atmospheres is equal to the pressure in the saturator column 45, which means that compressor 3a is out of operation, and the hydrogen is introduced into the bottom part of column 45 at a temperature of 170° C. and leaves this column in the form of a mixture of hydrogen and water vapor with a volume ratio of 1:1½, 43% of the total amount of water to be taken up by the hydrogen has to be supplied in the form of fresh steam, if one heat exchanger 13 (see Figure 1) is applied.

If, however, the compressor 3a is applied and the pressure in the saturator column 45 amounts to, e.g. 12.5 atm., while the pressure in condenser 6 is 20 atm., only 14% of the water vapor to be taken up by the hydrogen need be supplied as fresh steam in case one heat exchanger 13 is used. Additionally, if two branch currents extracted from the column exchange heat in the heat exchangers 13a and 13b (see Figure 3), in conjunction with compressor 3a, no fresh steam need be supplied under otherwise unchanged conditions. In this case, the temperature of the water extracted from the bottom part of column 6 is, e.g. reduced in the heat exchanger 13b from 184° C. to 152° C., while the water transported by pump 9b from column 45 is heated from 147° C. to 179° C.

In the heat exchanger 13a, the water having flowed through the upper part of the column 6 is cooled down from 152° C. to 127° C., while the water extracted from the bottom part of the saturator column is heated from 122° C. to 147° C. The mixture of hydrogen and water vapor has a dew point of 167° C. and, after compression in compressor 3a, a temperature of 257° C. and a dew point of 187° C. The mixture leaving at the top of the condenser column is saturated and has a temperature of 130° C., when the partial pressure of the water vapor is only 2.8 atm.

Consequently, nearly 90% of the water vapor present in the mixture composed of hydrogen and water vapor is removed in condenser column 6. The remainder of the water vapor may be removed in a final condenser which is not shown in the drawing, after which drying is completed in drying plant 7 filled with silica gel or another drying agent.

The energy economy can be promoted still further by thermally coupling the condenser column and the saturator column not via heat exchangers but directly. This can be done by supplying the hot water extracted from the condenser column to the saturator and returning the water cooled in the saturator to the condenser. By operating in this way, the temperature difference, which is the driving force enabling the heat exchange in the heat exchangers, becomes superfluous, thus permitting the compression ratio required for the second compression to be reduced. In addition, the cost of investment for heat exchangers is avoided.

Figure 4:
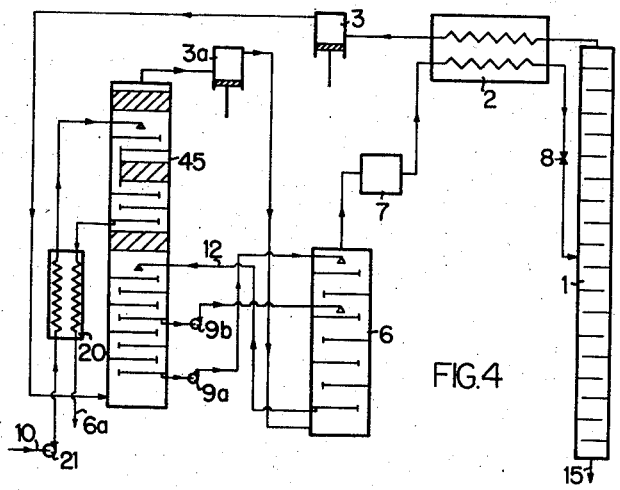

The last mentioned modification is shown in Figure 4 where the various devices are shown diagrammatically using reference numbers corresponding to those in Figures 1, 2 and 3. The essential difference in Figure 4 over the system of Figure 3 as regards the heat transmission between condenser 6 and the saturator section of column 45 is that the heat exchanger 13 of Figure 3 is omitted and the heat set free in condenser 6 is supplied to the saturator section of column 45 by the water flowing through conduit 12. This water gives off its heat in the saturator part by partial evaporation and is returned into the condenser column, partly by pump 9b and partly by pump 9a.

It is possible, dependent upon the degree of heat economy desired, to effect the return of the water from the saturator part of column 45 to the condenser column by means of one conduit provided with a pump or by means of several conduits provided with pumps, which conduits extract the water from the saturator part at different levels and feed it at different levels into the condenser.

There is always some loss in the hydrogen which is kept circulating due to leakage and the fact that some of the hydrogen is continuously entrained in the deuterium-poor water discharged from the process. This loss must be made up by the addition of hydrogen which should preferably be as pure as possible. By preference use is made of hydrogen obtained electrolytically from degassed water, the hydrogen being supplied directly to the first compression stage. Any traces of oxygen present therein are thus converted into water, so that no difficulty is caused later on in the cooling and rectification processes.

The water to be introduced into the process should be substantially pure in order to prevent fouling and blockage of the apparatus. Therefore, the water should be dimineralized as well as degassed before use.

If water which is already somewhat enriched with HDO is available, it is possible to feed the catalytic exchange section with this enriched water, thus effecting an increase in the production of heavy water. Generally, however, the amount of enriched water available is rather small. Accordingly, it is necessary to feed ordinary water together with the limited quantity of the enriched water to the catalytic exchange section. In case the conversion is effected in several steps and separate water currents are fed to the various steps, it is most advantageous to carry out the conversion in the initial steps with ordinary water and to use the enriched water only for effecting the conversion in the last step. So this water will be introduced as a separate stream into the last scrubber.

Any known method of effecting the catalytic transfer of deuterium from the water to the hydrogen can be used in the process of the present invention. Typically suitable catalysts are the hydrogenation catalysts such as Pt on an $Al_2O_3$ carrier or Ni on a $Al_2O_3$ carrier. Reaction conditions include contacting the hydrogen-water vapor with the catalyst at 100 to 800° C. and 1 to 30 atmospheres pressure.

Rectification of the deuterium enriched hydrogen can also be carried out under conventional operating conditions. These include a pressure from 2 to 1 atmospheres and a temperature of —250 to —253° C.

Known methods may be used for recovery of the deuterium from the bottom product and its subsequent oxidation, e.g. by combustion with oxygen, to heavy water. Thus the bottom product may be again rectified in a smaller column yielding a bottom product of rather pure HD, the latter being vaporized and heated up to room temperature and brought into contact with a catalyst promoting the reaction $2HD \rightleftarrows H_2 + D_2$, the resulting mixture being again cooled down and rectified in a third column, yielding a bottom product of substantially pure $D_2$, which is vaporized and burned with oxygen to give heavy water of high purity.

It will be appreciated that various modifications may be made in the invention described herein without deviating from the scope thereof as defined in the appended claims wherein I claim:

1. A process for recovering deuterium from water which comprises (1) providing a circulating supply of hydrogen under pressure; (2) continuously feeding water into said hydrogen and catalytically transferring deuterium from said water to said hydrogen; (3) further compressing the thus treated hydrogen; (4) separating the resulting deuterium-poor water from the deuterium-enriched hydrogen and drying the latter; (5) cooling said deuterium-enriched hydrogen by allowing the same to expand; (6) subjecting the thus cooled deuterium-enriched hydrogen to low temperature rectification to obtain substantially deuterium-free hydrogen as the top product and a deuterium-rich, bottom product; (7) passing the substantially deuterium-free top product in heat exchange relationship with the dried deuterium-enriched hydrogen prior to rectification to lower the temperature of said enriched hydrogen; (8) thereafter compressing said top product to a pressure which is 40 to 85% of the pressure to which the hydrogen is compressed prior to separation of the water therefrom in step (4) and recycling the thus compressed top product as the circulating supply of hydrogen; and (9) recovering deuterium from the bottom product.

2. The process of claim 1 wherein the deuterium-enriched hydrogen is under a pressure of from 10 to 100 atmospheres when subjected to expansion.

3. A cyclic process for recovering deuterium from water which comprises (1) providing a circulating stream of hydrogen gas; (2) feeding water into said hydrogen gas so as to form a mixture of hydrogen gas saturated with said water; (3) catalytically transferring deuterium from the water in said mixture to said hydrogen; (4) cooling the resulting mixture to separate the resulting deuterium-poor water by condensation from the deuterium-enriched hydrogen; (5) drying said deuterium-enriched hydrogen; (6) permitting said dried gas to cool by expansion; (7) subjecting the expanded gas to low temperature rectification to obtain substantially deuterium-free hydrogen as a top product and a deuterium-rich bottom product; (8) passing the substantially deuterium-free top product in heat exchange relationship with the dried hydrogen prior to rectification to lower the temperature thereof; (9) thereafter recycling said top product as said circulating stream of hydrogen under sufficient compression to maintain a pressure during the formation of said hydrogen-water mixture and said catalytic transfer which is 40 to 85% of the pressure at expansion; (10) compressing said mixture to the final pressure for expansion prior to separation of the deuterium-poor water and (11) recovering deuterium from the bottom product by rectification thereof.

4. The process of claim 3 wherein condensation is effected by passing said mixture in heat exchange relationship with cooling water.

5. The process of claim 4 wherein the water fed into said hydrogen gas is preheated by passing same in heat transfer relationship with water used for effecting condensation.

6. The process of claim 5 wherein the condensed water is used to saturate additional hydrogen and excess water from said saturating step is used as cooling water.

References Cited in the file of this patent

UNITED STATES PATENTS

| 2,690,379 | Urey | Sept. 28, 1954 |
| 2,895,803 | Spevack | July 21, 1959 |

OTHER REFERENCES

Selak et al.: "Chemical Engineering Progress," vol. 50, No. 5, pp. 227–228 (May 1954).

Antwerpen: "Nuclear Engineering," Part 1, pp. 273–274.